Patented July 11, 1939

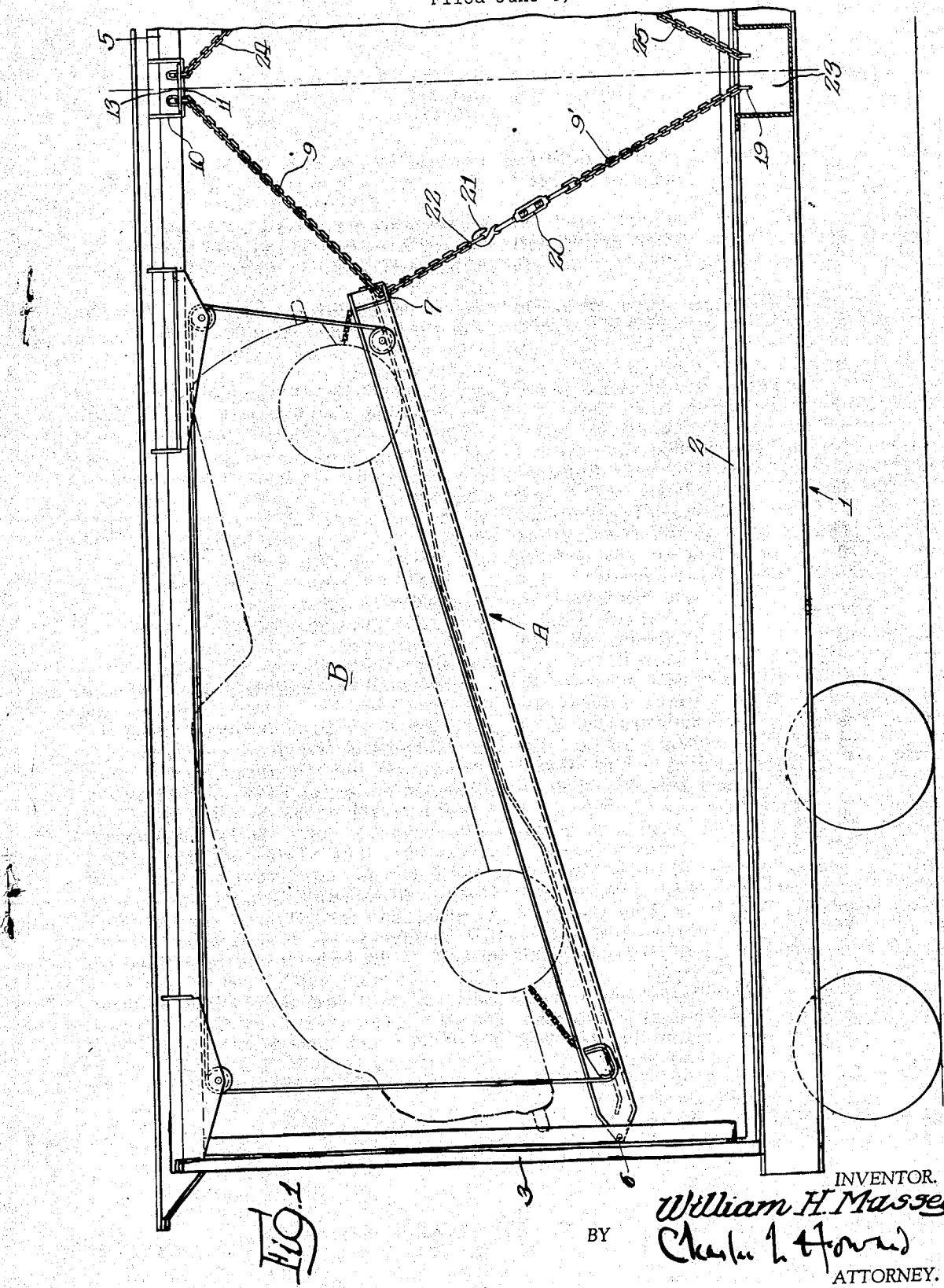

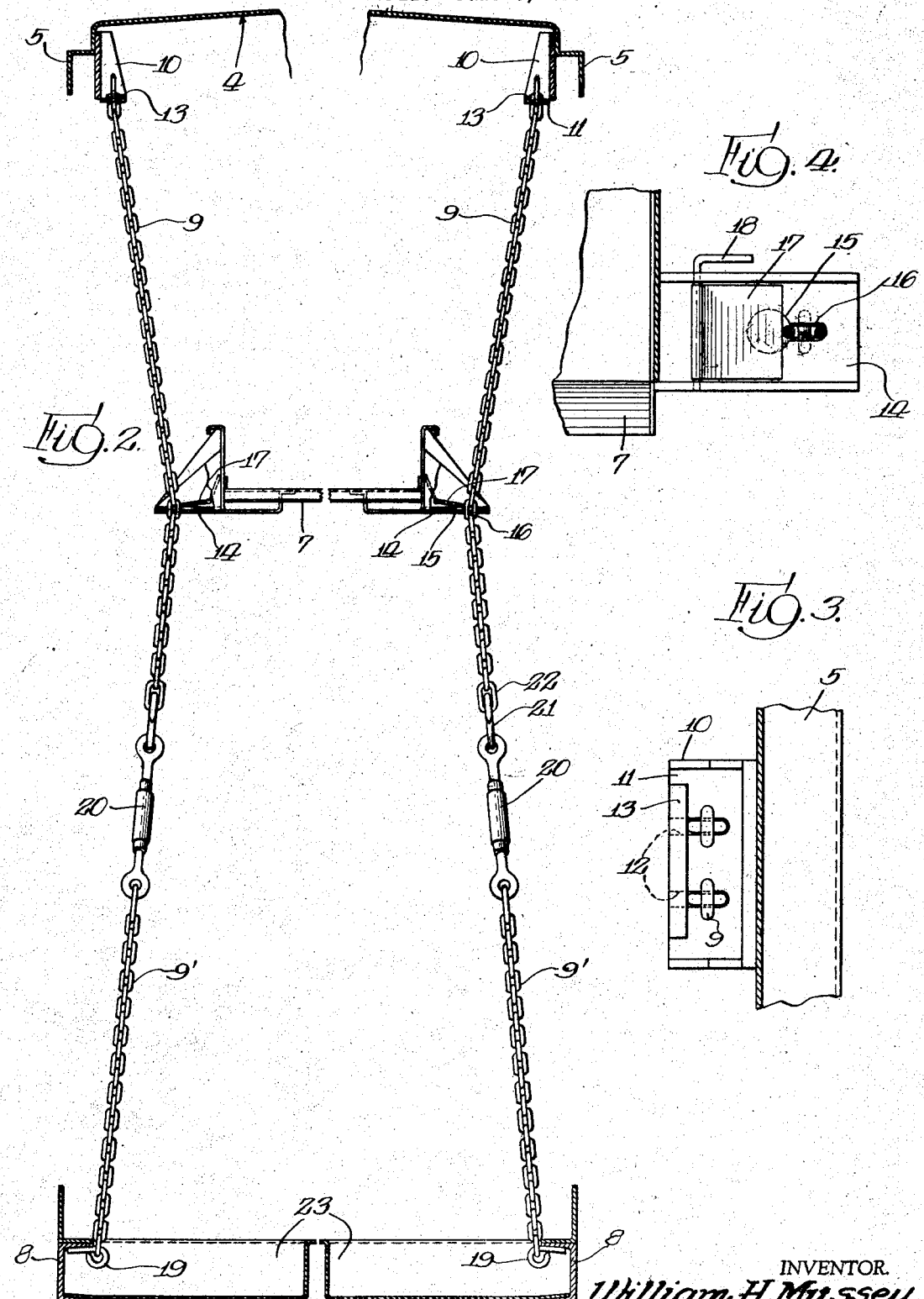

2,165,406

UNITED STATES PATENT OFFICE 2,165,406

DECK SUPPORTING DEVICE

William H. Mussey, Chicago, Ill.

Application June 6, 1938, Serial No. 211,993

15 Claims. (Cl. 105—368)

My invention relates to supporting mechanism for an end of a deck which deck is adapted to hold a vehicle such as an automobile in a freight car.

In loading automobiles, preferably four in number, in freight cars, it is common practice to secure two automobiles on the floor of the car and secure an automobile upon a deck over each floored automobile. Decks for this purpose preferably have an end pivoted or indexed to the car body, the opposite end being free to be raised or tilted in order to provide room therebeneath for one of the automobiles secured to the car floor. When the end of the deck is so raised or tilted it is essential that that end be held securely in its proper position and easily released in order that the deck may be lowered to the floor.

The objects of my invention are to provide means for cheaply, efficiently and safely supporting an end of a deck in its elevated position; to provide a supporting device which is easily and quickly withdrawn from its operating position; to provide means whereby when the free end of the deck is being supported it cannot accidentally be raised or lowered and to provide means whereby in case the deck hoisting cables fail, the deck will be safely suspended.

In the drawings,

Figure 1 is a side elevation of a deck, with an automobile thereon, held in elevated position by means of my invention;

Figure 2 is an enlarged front elevation of Figure 1;

Figure 3 is a detailed plan view of an improved means for anchoring the suspension means adjacent the roof of the car;

Figure 4 is a detailed plan view of that portion of the deck which cooperates with the suspension means.

Similar numbers and letters of reference refer to similar parts throughout the drawings.

1 represents the freight car generally in which the deck is supported; 2, the floor of the car; 3, an end of the car and 4 the car roof generally. 5 represents the car side plates and A designates the deck generally which is of the type having longitudinal side members and front and end cross members, 7 indicating the front cross member. It is to be understood, however, that my invention may be used in conjunction with any form of deck. 8 represents car sills of any approved type and 9, 9' indicate a two-part flexible suspension member shown as chains, and 10 a bracket secured to side plates 5 or any other suitable part of the car adjacent the roof thereof and the door opening. 11 designates the horizontal floor portion of the bracket 10, and 12 slots in the bracket running at right angles to the car side. 13 represents a securing plate, the purpose of which will be explained later.

14 designates an extension or bracket upon the side of the deck adjacent its forward end, this extension or bracket having therein a circular opening 15 and a connecting elongated slot 16. This extension or bracket may be of any suitable shape and may be integral with or detachably fixed to the deck. 17 represents a pivoted cover plate for the circular opening 15, and 18 an operating handle therefor, the purpose of which will be explained later. 19 is an anchor for the lower end of flexible member 9', the anchor being welded or otherwise secured to side sill 8 or other portion of the car adjacent the floor. 20 is a turnbuckle attached to the upper end of member 9' and has at its upper end a hook 21 and the lower end of member 9 has a cooperating eye 22 for the hook. 23 is a housing for the flexible member 9' and turnbuckle 20, the purpose of which will be explained more fully in the following operation.

While I have explained only one two-part securing member 9, 9', for one side of the deck, it is to be understood that a similar arrangement is employed on opposite side of the deck as clearly shown by Figure 2. Also it is understood that the arrangement covered by my invention may be used with a second deck in the freight car, a portion of flexible members for this purpose being shown in Figure 1 by 24 and 25, and the bracket for this purpose being shown by Figure 3.

Assuming that a freight car is to be loaded with four automobiles, it is necessary to load an automobile B upon a deck A and raise the free end of the deck in elevated position. This is accomplished by any suitable hoisting and cable mechanism and by pivotally connecting or indexing the rear end of the deck to the car structure as at 6. After the free end of the deck with its automobile thereon is so elevated, by means of my invention the end of the loaded deck is securely held in its elevated position. When, by means of the cable and winding mechanism, the front end of the deck is elevated, the flexible member 9, being securely held in the slots 12 of the bracket 10 by securing plate 13 welded or otherwise attached to the floor 11 cf the bracket, is passed through opening 15. It is, of course, understood that the eye 22 is of a size that permits it to pass through opening 15. Thereupon flexible member 9', securely attached at its lower end to the side sill 8 by means of an anchor 19, is connected at its upper end to flexible member 9 through hook and eye means 21, 22.

The two-part supporting member now being connected, a link of member 9 passes from opening 15 into elongated slot 16 and due to the fact that adjoining links to the one in the slot are at right angles to the slot the flexible suspension member has non-slip engagement in the slot and thus the end of the deck is securely held in its proper position and cannot accidently be raised or lowered. Should there be any slack in the two-part flexible member, turnbuckle 20 may be operated.

It will be noted, as shown by Figure 2, the distance between the two slots 16 is less than the distance between the two upper brackets 10 and lower securing means 19 and, consequently, the flexible members through tension will normally remain in the slots 16. However, to prevent accidental withdrawal of the flexible members from the slots 16, 16, under extremely unusual conditions, I have provided a pivoted cover 17 for the circular openings 15, which cover may be placed in or out of position by means of handle 18. It will be seen that when these pivoted plates cover the circular openings 15 it is impossible for the flexible members to be accidentally withdrawn from the slots 16.

After the deck is held in the position as above described and it is found necessary to further elevate the deck, it is only necessary that the pivoted plates 17 be withdrawn from the openings 15 and that the chain be pulled into said openings and the deck be elevated.

When the unloaded deck is raised by means of its cable and winding mechanism to the roof of the car, the upper portion 9 of the flexible member is stored adjacent the roof and the lower portion 9' is stored in any suitable housing 23 underneath the floor of the car.

While I have preferably shown the flexible suspension members in the form of chains, it is understood, of course, that any type of flexible means may be employed provided such means have portions which when passed through openings 15 on the deck may be held from slipping when positioned in slots 16.

Although a specific embodiment of the invention has been illustrated and described, it will be understood that various alterations in the details of construction may be made without departing from the scope of the invention, as indicated by the appended claims.

What I claim is:

1. Means for supporting an end of a vehicle loading deck in a freight car including a deck having in said end portion an elongated slot, a flexible member having non-slip engagement in said slot one end of said flexible member being anchored adjacent the roof of the car and the opposite end of the flexible member being anchored adjacent the floor of the car.

2. Means for supporting an end of a vehicle loading deck in a freight car including a deck having in said end portion an elongated slot, a flexible member having non-slip engagement in said slot, the flexible member being anchored at one end adjacent the roof of the car and anchored at its other end adjacent the floor of the car, and tensioning means for said flexible member.

3. Means for supporting an end of a vehicle loading deck in a freight car including a deck having in said end portion an elongated slot, a flexible member comprising a chain a link of which is adapted to have non-slip engagement in said slot and means to anchor one end of said flexible member above said slot and means to anchor the opposite end of said flexible member below said slot.

4. Means for supporting an end of a vehicle loading deck in a freight car including a deck having in said end portion an opening, a flexible supporting member for said deck adapted to pass through said opening and means associated with said opening and cooperating with said flexible member to prevent relative movement between said deck and said flexible member one end of said flexible member being anchored adjacent the roof of the car and the opposite end of said flexible member being anchored adjacent the floor of the car.

5. Means for supporting an end of a vehicle loading deck in a freight car including a deck having in said end portion an opening, a flexible supporting member for said deck adapted to pass through said opening, means associated with said opening and cooperating with said flexible member to prevent relative movement between said deck and said flexible member and means to anchor one end of said flexible member to a bracket adjacent the roof of the car and means to anchor the opposite end of said flexible member to the car side sill.

6. Means for supporting the ends of a vehicle loading deck in a freight car including pivoted means connecting one end of the deck to the car body, an elongated slot in a portion of the opposite end of said deck, a flexible member having non-slip engagement in said slot and means to anchor one end of said flexible member adjacent the car roof and the opposite end of said flexible member adjacent the car floor.

7. Means for supporting an end of a vehicle loading deck in a freight car including a deck having in said end portion an elongated slot, a chain link of which is adapted to have a non-slip engagement in said slot and means to anchor one end of said flexible member adjacent the car roof and means to anchor the opposite end of said flexible member adjacent the car floor.

8. Means for supporting an end of a vehicle loading deck in a freight car including a deck having in said end portion an opening and an elongated slot associated with said opening, a link-chain adapted to pass freely through said opening and having a link adapted to fit in non-slip engagement within said slot, means to anchor the ends of said flexible member in said car one end being anchored adjacent the car roof and the opposite end being anchored adjacent the car floor and tensioning means for said flexible member.

9. Means for supporting an end of a vehicle loading deck in freight cars including a flexible member attached at one end adjacent the roof of the car and attached at its other end adjacent the floor of the car, an opening in the deck adjacent an end thereof through which said flexible member freely passes whereby relative movement is permitted between the deck and said flexible member, and means associated with said opening and cooperating with said flexible member to prevent said relative movement and to hold the end of the deck in position.

10. Means for supporting an end of a vehicle loading deck in freight cars including a flexible member attached at one end adjacent the roof of the car and attached at its other end adjacent the floor of the car, means comprising an opening in the deck adjacent the end thereof through which said flexible member freely passes whereby relative movement is permitted between the deck and said flexible member and a slot associated with said opening and cooperating with said flexible member to prevent said relative movement and to hold the deck in position.

11. Means for supporting an end of a vehicle loading deck in freight cars including a flexible member attached at one end adjacent the roof of the car and attached at its other end adjacent the floor of the car, a bracket upon said deck adjacent an end thereof having therein an opening through which said flexible member freely passes whereby relative movement is permitted between the deck and said flexible member and a slot in said bracket associated with said opening and cooperating with said flexible member to prevent said relative movement and to hold the deck in position.

12. Means for supporting an end of a vehicle loading deck in freight cars including a link-chain flexible member attached at one end adjacent the roof of the car and attached at its other end adjacent the floor of the car, an opening in the deck adjacent an end thereof through which said link-chain freely passes whereby relative movement is permitted between the deck and said chain, and a slot associated with said opening and cooperating with links of said chain to prevent said relative movement and to hold the end of the deck in position.

13. Means for supporting an end of a vehicle loading deck in freight cars including a two-part flexible member one part of which is attached at one end adjacent the roof of the car and the other part of which is attached at one end adjacent the floor of the car, means to connect the free ends of both members, means upon the deck adjacent an end thereof through which said flexible member freely passes and whereby relative movement is permitted between the deck and said flexible member, means associated with said last mentioned means and cooperating with said flexible member to prevent said relative movement and to hold the end of the deck in position and turnbuckle means associated with said connected two-part flexible member for the purpose of taking up slack in said flexible member.

14. Means for supporting an end of a vehicle loading deck in a freight car including a deck having in said end portion an opening and a connected elongated slot, a link-chain adapted to pass freely through such opening and having a link adapted to fit in non-slip engagement within said slot, a pivoted cover for said opening, means to anchor the ends of said flexible member in said car one end of the flexible member being anchored adjacent the car roof and the opposite end of the flexible member being anchored adjacent the car floor, and tensioning means for said flexible member.

15. Means for supporting an end of a vehicle loading deck in a freight car comprising a two-part flexible link-chain member, one part of which is attached at its upper end to the car structure adjacent the roof thereof and having upon its lower free end a closed eye, the second part of which is attached at its lower end to the car structure adjacent the floor thereof and having a hook upon its free end for cooperation with said eye, an opening in the end of the deck through which the first mentioned part of the flexible member freely passes, an elongated slot associated with said opening adapted for the reception of a link in non-slip engagement with said slot, a pivoted cover for said opening and tensioning means such as a turnbuckle for said two-part connected flexible member.

WILLIAM H. MUSSEY.